Figure 1:
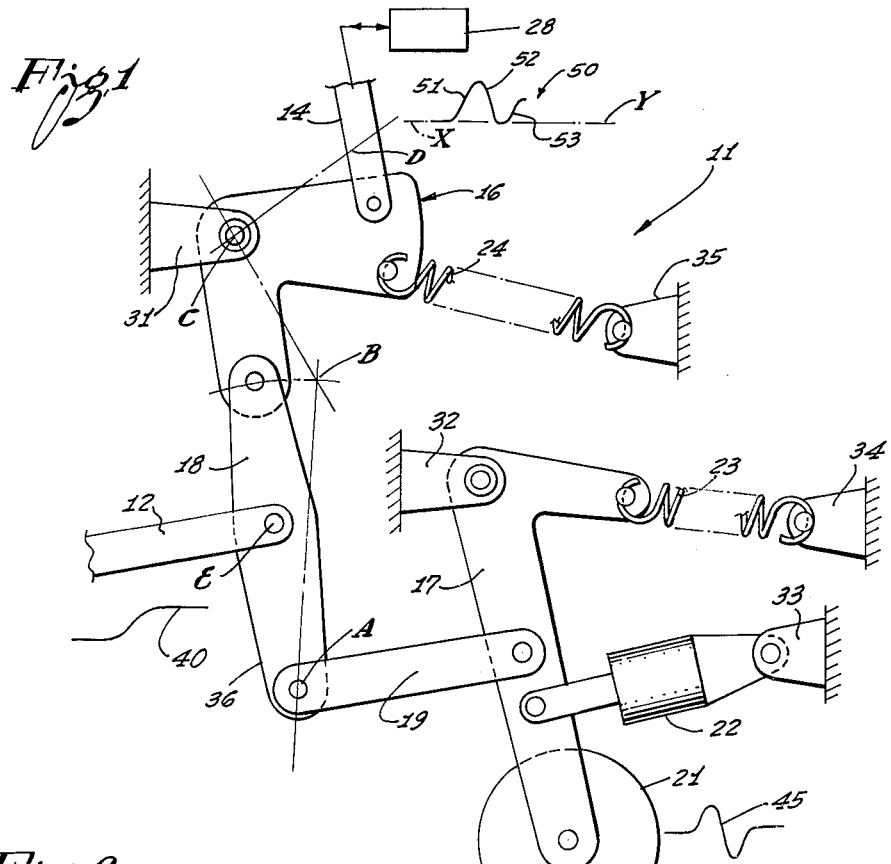

Sept. 14, 1965  W. B. MORRIS ETAL  3,205,728
CONTROL SYSTEM FOR VTOL VEHICLES
Filed Nov. 6. 1961  2 Sheets-Sheet 1

INVENTORS:
Willis B. Morris
Ivan Saworotnow

By Willard M. Graham
Agent

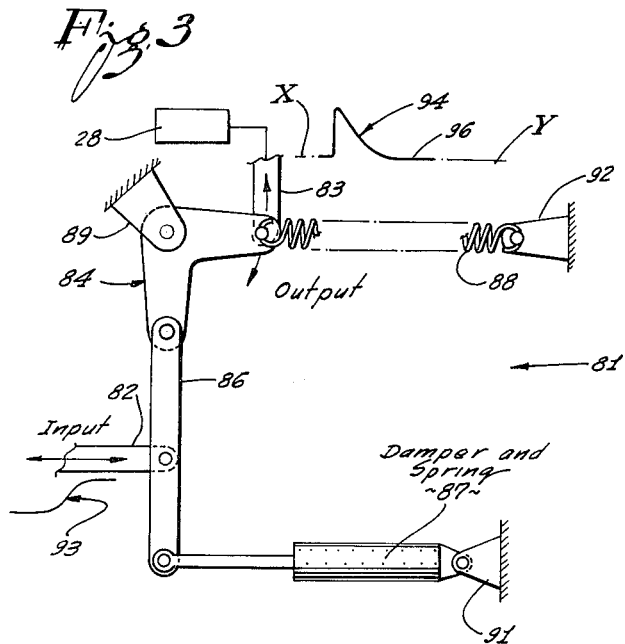
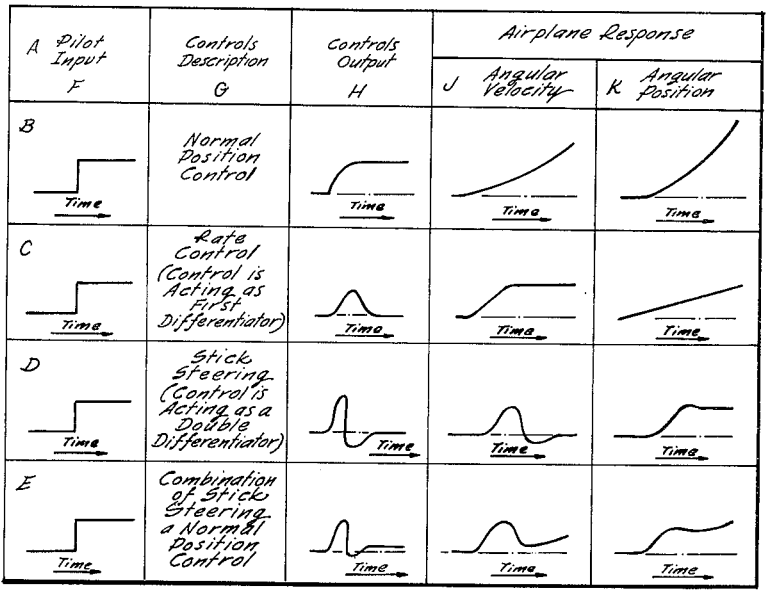

United States Patent Office
3,205,728
Patented Sept. 14, 1965

3,205,728
CONTROL SYSTEM FOR VTOL VEHICLES
Willis B. Morris, Redondo Beach, and Ivan Saworotnow, Norwalk, Calif., assignors to Northrop Corporation, Beverly Hills, Calif., a corporation of California
Filed Nov. 6, 1961, Ser. No. 150,288
2 Claims. (Cl. 74—516)

This invention pertains to flight control systems for aircraft and more particularly to an all-mechanical control system for VTOL/STOL aircraft functioning in response to displacements of the pilot's controls to improve the controllability thereof during the VTOL/STOL portions of their flight.

It is well known that conventional aircraft are rendered stable by aerodynamic forces acting on their control surfaces. The above statement, however, is not true of VTOL/STOL aircraft when such aircraft are executing the VTOL/STOL portions of their flight phase. During the VTOL phase of operation, the conventional control surfaces of a VTOL/STOL aircraft are ineffective, in fact completely useless; consequently some alternative method of control is required.

Reaction jets and/or differential thrust devices have been utilized to control VTOL/STOL aircraft during flight operations thereof, however, employing such devices without modification requires an extremely high level of skill on the part of a pilot. To reduce the demand on the pilot, electronic autopilot elements or electronic stability augmentation have been utilized, their complexity, however, has not permitted the degree of reliability which can be obtained from a purely mechanical system as disclosed herein.

Accordingly it is a primary object of this invention to provide a purely mechanical control system for VTOL/STOL aircraft adapted to augment the controllability thereof during their VTOL/STOL flight phases.

Another object is to provide a purely mechanical control system for VTOL/STOL aircraft functioning to render the rate of displacement thereof proportional to stick movement.

Another object is to provide a purely mechanical control system for VTOL/STOL aircraft providing a restoring output command proportional and opposite to the pilot's input command and therefore provides the pilot with a "stick steering" control system.

Another object is to provide a purely mechanical control system for VTOL/STOL aircraft adapted to provide any desired combination of rate and "stick steering" control and acceleration control.

Another object is to provide a purely mechanical control system for VTOL/STOL aircraft which is simple in design yet rugged in construction, practically free of malfunctioning tendencies, economical to manufacture, and may be easily and readily adapted in numerous applications.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 constitutes a schematic drawing illustrating a preferred embodiment of the all-mechanical control system as disclosed herein.

Figure 2:
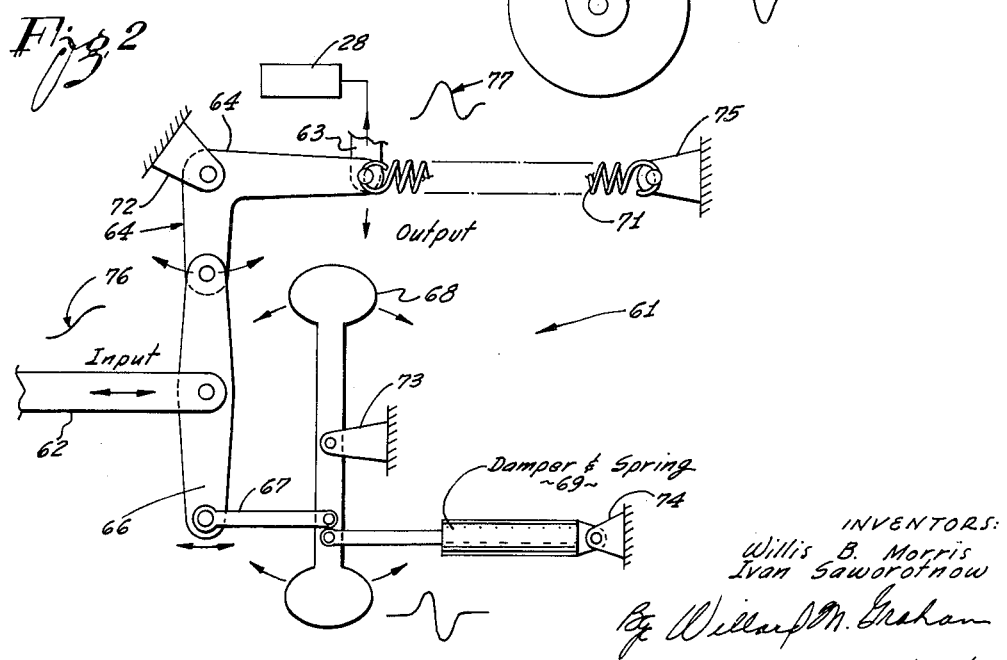

FIGURES 2 and 3, constitutes drawings similar to FIGURE 1, but showing other embodiments which the control system as disclosed herein may assume.

FIGURE 4 graphically illustrates the angular response of VTOL/STOL aircraft resulting from a pilot's input command as modified by the control system as disclosed herein.

As referred to herein, the term "VTOL/STOL" refers to vertical take-off and landing and/or short take-off and landing operations, the term "VTOL/STOL aircraft" refers to airplanes having vertical take-off and landing and/or short take-off and landing capabilities and the term "aircraft" refers to airplanes relying entirely on aerodynamic surfaces for stability during the wing supported portion of their flight.

A conventional VTOL/STOL control stick, rudder control, or thrust vector control produces airplane accelerations proportional to control displacement. This means that the pilot of a conventional aircraft has to sense the aircraft's displacement thereof from a desired position, the aircraft's instantaneous velocity, and the change of velocity resulting from his command. In other words, to maintain control of his VTOL/STOL aircraft it is necessary for the pilot to perform mentally both single and double differentiation of position error.

A control configuration performing one or both of these differentiations would render a VTOL/STOL aircraft as easy to control during their VTOL/STOL flight phases (that is at such times as dynamic damping and restoring forces are not present) as they are during the cruise phase of their flight.

Double differentiation as referred to above may be effected by utilizing any one of the control mechanisms as described herein and shown in the drawings when used in series with the pilot's controls. Each embodiment will provide the pilot of a VTOL/STOL aircraft with a "stick-steering" control system.

The functional characteristics of various control systems as disclosed herein are graphically illustrated in FIGURE 4. "Airplane response" (columns J and K) corresponding to "pilot input" (column F) for a conventional control system is shown in line B. In this illustration (conventional control) the vehicle's acceleration is proportional to the pilot control displacement, first or second differentiation is not present. In line C a relationship in which the control system functions as a first differentiator is illustrated. In the relationship illustrated in lines D and E, the control system functions as a double differentiator, the "controls output" curve (line E, column H) is considered optimum. Accordingly control mechanisms as illustrated and described herein are designed to provide a "control output" as illustrated in this line or substantially so.

The all-mechanical control systems disclosed herein are capable of improving the apparent stability of VTOL/STOL aircraft by effecting the equivalent of the aforementioned double differentiation and providing the optimum "output pulse" illustrated in FIGURE 4.

Referring now to FIGURE 1, here the system or mechanism, indicated in its entirety by the numeral 11, includes an input member 12, output member 14, bell crank members 16 and 17, equalizing link 18, intermediate link 19, mass 21, damper means 22 and springs 23 and 24.

The output member 14 is attached to and operates a valve 28 which in turn controls the duration and magnitude of a thrust pulse provided by a VTOL/STOL an auxiliary jet or other means (not shown). In an aircraft installation the auxiliary jets or thrust pulses will be located at conventional positions with respect to the center of gravity thereof according to the particular axis that they funcion to control, that is roll, pitch or yaw.

By referring further to FIGURE 1 it will be seen that the bight portions of the crank members 16 and 17, the closed end of the damper 22 and one end of each of the springs 23 and 24 are pivotally attached to fixed structure as indicated by the numerals 31–35, inclusive. The other ends of the springs 23 and 24 are pivotally attached to respective arms of the crank members 17 and 16, the rod end of the damper means 22 is pivotally attached to the other arm of the crank member 17. Other members, constituting components of the mechanism 11, are assembled to allow pivotal movement therebetween substantially as shown in FIGURE 1.

Once the balance of the mechanism is disturbed, the spring 24 functions to return the crank member 16 to a neutral position. For purposes of illustration the position of the crank 16 and mechanism 11, shown by solid line construction in FIGURE 1, is assumed to be the neutral position thereof, that is the position in which the aforementioned auxiliary jets or thrust pulses are not functioning.

The following is a description of operation of the mechanism 11. Initial movement or a disturbing force is imparted to the mechanism 11 by the pilot of a VTOL/STOL aircraft embodying the mechanism 11. For example, a pilot's input, represented by the curve identified by the numeral 40, is applied to the equalizing link 18. This input causes the link 18 to pivot in a clockwise direction about its lower end 36 to a new position indicated by the broken line A–B. Initially movement of the link 18 occurs about the end 36 due to the fact that the inertia of the mass 21 and force provided by the damper means 22 must be overcome before movement of the end 36 can occur.

The above mentioned movement of the link 18 is imparted to the crank 16 causing the latter to pivot about fixed structure 31 in a counter-clockwise direction to a new position indicated by the broken lines C–B and C–D. The spring 24, which is now under tension, exerts a force on the crank 16 tending to return it to its neutral or solid line position. The force exerted by the spring 24 imparts counter-clockwise movement to the link 18 about its pivotal point on the member 12 (point E). This movement in turn imparts a counter-clockwise movement to the crank 17 about its pivotal point on the fixed structure 32 and oscillating movement to the mass 21. Oscillating movement of the mass 21 is quickly dampened out by the spring 23 and damper means 22, the movement and damping action of the mass 21 is represented by the curve 45.

The initial movement of the input member 12 causes the valve 28, subsequently the auxiliary jets associated therewith, to provide a thrust pulse in response and proportional to the pilot's input command as represented by the forward inclined portion 51 of the output curve 50. After the initial thrust is imparted to the auxiliary jets, and assuming that subsequent movement is not imparted to the mechanism by the member 12, the spring 24 functions as described above to return the crank 16 to its neutral position. During this phase of operation of the mechanism 11 the thrust pulse decays as indicated by the portion 52 of the curve 50 and oscillation of the mass 21 is initiated. As the mass 21 oscillates it will be seen that the valve 28 is oppositely actuated resulting in the auxiliary jet functioning to provide an opposite and countering pulse indicated by the portion 53 of the curve 50.

The countering pulse 53—just described—functions to arrest movement of a VTOL/STOL aircraft previously imparted thereto by the pilot's input command represented by the portion 51 of the curve 50. Such a countering pulse relieves the pilot of sensing the VTOL/STOL aircraft's displacement from a desired position, the VTOL/STOL aircraft's instantaneous velocity and the change resulting from his command.

It is significant that the pilot's command can provide an accurate predication of the countering pulse necessary to restore the VTOL/STOL aircraft to equilibrium. It is equally significant that the pilot's control displacement and/or force can be used to program or preshape the output command mechanically. Thus the all-mechanical mechanism 11 avails itself of the above features utilizing them to preshape the output pulse, to provide the pilot with "stick-steering" and to improve the apparent stability of a VTOL/STOL aircraft.

Although the mechanism 11 functions to preshape and provide an optimum output pulse as shown in FIGURE 4, line E, column H, characteristics of the countering pulse may be made compatible with the specific characteristics of a VTOL/STOL aircraft and other conditions. In other words the countering pulse may be shaped to coincide with the line X–Y or it may be made of greater magnitude. Reshaping of the countering pulse 53 may be accomplished by varying the relative spring rates of the springs 23 and 24, the force exerted by the damper 22 or by altering the weight of the mass 21. In this respect the reshaping of the countering pulse 53 will be apparent to those skilled in the art, accordingly further explanation in this respect is not believed necessary.

Referring now to FIGURE 2, the embodiment of the control mechanism shown in this figure, indicated in its entirety by the numeral 61, functions in substantially the same manner as the mechanism 11 previously described, its structural features, however, are somewhat different.

The control mechanism 61 includes an input member 62, output member 63, bell crank member 64, equalizing link 66, intermediate link 67, double ended mass 68, damper-spring combination 69 and spring 71. In this embodiment the bight portion of the crank 64, mass 68, the closed end of the damper-spring combination 69 and one end of the spring 71 are pivotally attached to fixed structure 72–75, inclusive. Other components comprising the mechanism 61, including a valve 28, are assembled and mounted in a VTOL/STOL aircraft substantially as shown in FIGURE 2.

The operation of the mechanism 61 is substantially the same as that of the mechanism 11 (FIGURE 1), accordingly a detailed description of this system is not believed necessary. At such time as a pilot initiated input, represented by the curve 76, is transmitted to the mechanism 61 a preshaped pulse, represented by the curve 77, is forthcoming from an auxiliary jet (not shown) due to the novel functioning of the mechanism 61.

Referring now to FIGURE 3, here still another embodiment of the control mechanism, indicated in its entirety by the numeral 81, is shown. This embodiment includes an input member 82, output member 83, bell crank 84, equalizing link 86, damper-spring combination 87 and spring 88. The bight portion of the crank 84 is pivotally attached to fixed structure 89, also the closed end of the damper-spring combination 87 and one end of the spring 88 are pivotally attached to fixed structure 91 and 92, respectively. Other components of the mechanism 81 are assembled and mounted in a VTOL/STOL aircraft substantially as shown in FIGURE 3.

This embodiment does not encompass a mass similar to the masses 21 and 68 of FIGURES 1 and 2, respectively. Accordingly as a pilot's input—characterized by the curve 93 of FIGURE 3—is imparted to the mechanism 81 a preshaped output pulse—represented by the curve 94—is forthcoming. In this embodiment it will be seen that a counter and opposite pulse is not provided, rather a residuum thrust, represented by the near horizontal portion 96 of the curve 94, is provided. When aerodynamic damping is present, residuum portion 96 of the curve 94 functions to maintain the initial velocity imparted to the aircraft, for example—by an auxiliary jet (not shown) as represented by the initial portion of the curve 94, until such time as a countering pulse is applied.

It will be apparent to those skilled in the art that the residuum portion 96 of the curve 94 may coincide with the line X–Y or a residuum thrust provided at any magnitude less than the maximum thrust by varying the relative strength of the damper-spring combination 87 and the spring 88.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A mechanical control system for VTOL/STOL aircraft adapted to improve the apparent stability thereof at such times as the aircraft are executing VTOL/STOL portions of their flight phase comprising: first and second bell crank members the bight portions of which are pivotally secured to fixed structure; an output member pivotally secured to one arm of said first crank member; first helical spring means the ends of which are pivotally secured to said one arm of said first crank member and fixed structure, respectively; an elongated equalizing link having one end thereof pivotally secured to the other arm of said first crank member; an intermediate link the ends of which are respectively pivotally secured to the other end of said equalizing link and one arm of said second crank member; a mass secured to said one arm of said second crank member; damper means secured to fixed structure and extending therebetween and said one arm of said second crank member in pivotal relation; second helical spring means secured to and extending between fixed structure and the other arm of said second crank member; an input member pivotally secured to said equalizing link at a location intermediate the ends thereof; said first crank and output member normally having a neutral position assumed prior to any movement being imparted thereto by said input member; said first spring means acting to urge said first crank member and output members toward said neutral positions at such times as they are moved therefrom; and said first and second crank members, equalizing and intermediate links, mass, damper means and first and second spring means cooperating to impart a primary motion to said output member corresponding and responsive to movement of said input member and a secondary motion in which said primary motion decays and thereafter a motion countering said primary motion.

2. A mechanical control system for VTOL/STOL aircraft adapted to improve the apparent stability thereof at such times as the aircraft are executing VTOL/STOL portions of their flight phase comprising: a bell crank member the bight portion of which is pivotally secured to fixed structure; an output member pivotally secured to one arm of said crank member; helical spring means the ends of which are pivotally attached to said one arm of said crank member and fixed structure, respectively; an elongated equalizing link one end of which is pivotally secured to the other arm of said crank member; an elongated mass member having individual masses secured to each end thereof; said mass member being pivotally secured to fixed structure at a location between the ends thereof; one end of said mass member being pivotally secured to the other end of said equalizing link; a spring-damper means having a closed end pivotally secured to fixed structure and a rod end pivotally secured to said mass member at a location adjacent the pivotal attachment thereof to said equalizing link; an input member pivotally secured to said equalizing link at a location intermediate the ends thereof; said crank and output member normally having a neutral position assumed prior to any movement being imparted thereto by said input member; said spring means urging said crank and output members toward said neutral position at such times as they are moved therefrom; and said crank member, equalizing link, mass member and spring-damper means cooperating to impart a primary motion to said output member in response to movement of said input member and subsequently a secondary motion to said output member modifying said primary motion.

References Cited by the Examiner

UNITED STATES PATENTS

| 374,786 | 12/87 | Everitt et al. | 74—518 |
| 1,547,133 | 7/25 | Strickland | 74—518 |
| 1,852,286 | 4/32 | Bragg et al. | 74—516 X |

FOREIGN PATENTS

| 491,637 | 3/53 | Canada. |
| 636,453 | 4/28 | France. |

BROUGHTON G. DURHAM, *Primary Examiner*.

MILTON KAUFMAN, *Examiner*.